March 18, 1952  R. H. WHEELER  2,589,649
CLUTCH CONTROL MECHANISM
Filed June 10, 1947  2 SHEETS—SHEET 1

INVENTOR.
RICHARD H. WHEELER
BY
ATTORNEY

March 18, 1952 R. H. WHEELER 2,589,649
CLUTCH CONTROL MECHANISM
Filed June 10, 1947 2 SHEETS—SHEET 2

INVENTOR.
RICHARD H. WHEELER
BY
H. O. Clayton
ATTORNEY

Patented Mar. 18, 1952

2,589,649

UNITED STATES PATENT OFFICE 2,589,649

CLUTCH CONTROL MECHANISM

Richard H. Wheeler, Utica, Mich., assignor to Bendix Aviation Corporation, South Bend, Ind., a corporation of Delaware Application June 10, 1947, Serial No. 753,682

4 Claims. (Cl. 192—075)

1

This invention relates in general to power means for operating the friction clutch of an automotive vehicle and in particular to clutch operating pressure differential operated power means controlled by the operation of an accelerator controlled pressure balanced valve.

Another object of my invention is to provide, in the power plant of an automotive vehicle including a friction clutch and an accelerator, a vacuum operated clutch control mechanism comprising a single acting fluid pressure motor, said motor being controlled by a three-way follow-up valve which is actuated, through the intermediary of a floating lever, by the accelerator and a pressure differential and spring operated motor.

Yet another object of my invention is to provide power means for operating the friction clutch of an automotive vehicle said power means serving to effect two stages of clutch engaging movement of the driving element of the clutch as it moves into engagement with the driven element of the clutch said two stage operation of the clutch driving element being effected by a throttle opening movement of the accelerator.

An important object of my invention is to provide a valve mechanism, preferably of the pressure balanced type, for controlling a clutch operating vacuum operated motor, said mechanism serving to limit the degree of evacuation of the motor in the operation of disengaging the clutch and thereby expediting the clutch engaging operation of said motor by virtue of the relatively short time required to bring the gaseous pressure within the motor back to atmospheric pressure.

Yet another object of my invention is to provide mechanism for operating one of the clutch plates of a friction clutch to effect a disengagement of the clutch and for controlling the movement of said plate to effect an engagement of the clutch, said mechanism including a vacuum operated motor, a follow up valve for controlling the operation of said motor, said valve being adapted to be moved to a lapped position to cut off the flow of air from the motor; and means, including adjustable stop means and a spring and pressure differential operated motor, for operating the valve to automatically effect a lapping thereof to limit the clutch disengaging evacuation of the motor to a certain factor, and for lapping said valve to control the clutch engaging operation of the motor.

Other objects of the invention will appear more fully hereinafter from the following detailed description when taken in connection with the accompanying drawings, wherein a single embodiment of the invention is illustrated.

2

Figure 1:
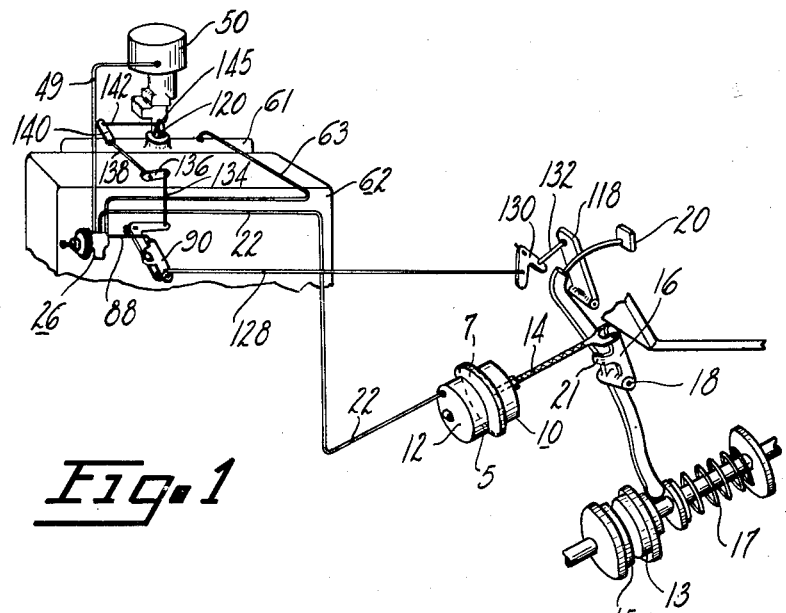
Figure 1 is a diagrammatic view disclosing a clutch control mechanism including the valve means constituting the essence of my invention.

Describing now that embodiment of my invention disclosed in the several figures of the drawings the principal elements thereof consist of a single acting vacuum motor 10 comprising a casing 12 and a power element such as a piston 7, which is connected to a friction clutch of a conventional design, including a driving plate 13, a driven plate 15 and a clutch spring 17. One end of the casing of the motor, a portion of the body thereof and the power element together outline a control chamber 5, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 2:
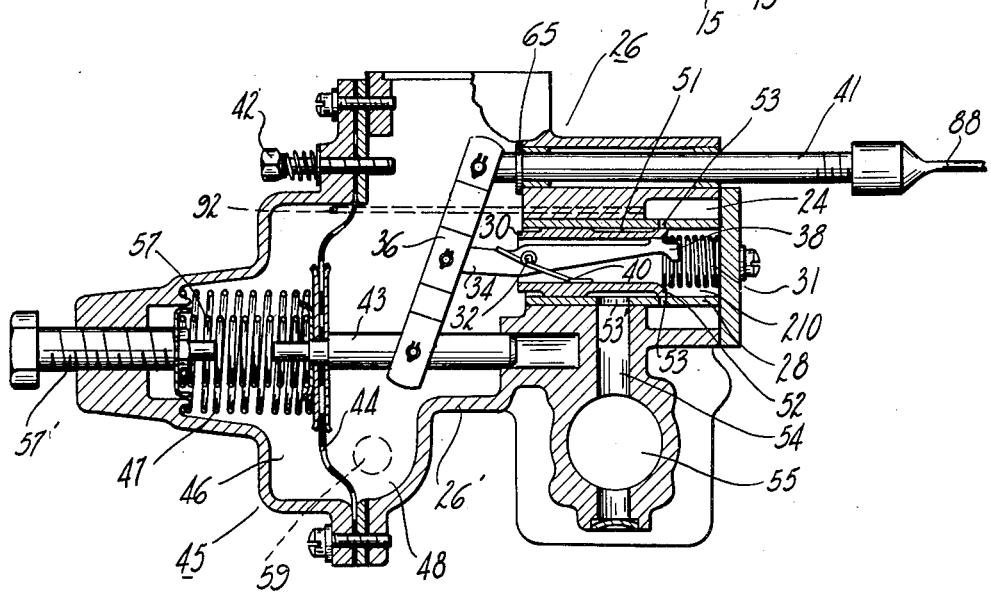
Figure 2 is a sectional view disclosing the details of the valve mechanism of my invention.

One end of the motor 10, that is the end of the same constituting a part of the aforementioned power compartment 5 of the motor, is connected by a conduit 22 to a compartment 24 of a control valve unit indicated as a whole by the reference numeral 26 disclosed in Figure 2. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 2.

A valve member 30, which is biased inwardly by a spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably connected to a two-part lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 2, the lever 36 is pivotally connected at one of its ends to a rod 41; and the movement of the rod to the left, Figure 2, is limited by a stop pin 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within a control compartment 46 of said motor, and by compression springs 47 and 57 within said compartment. A compartment 48 of the motor 45 is vented to the atmosphere via a port 59 and a conduit 49 which leads to an air cleaner 50, Figure 2. The springs 47 and 57 are preferably of relatively low and high rate respectively; and the operation of said springs is described in detail hereinafter.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner 50 via the motor compartment 48 and the interior of the valve.

The valve member 28 is provided with an opening 53' to register with one end of a duct 54 in the valve casing, said duct registering at its other end with a chamber 55 to which is connected a conduit 63 leading to the intake manifold 61 of the internal combustion engine 62 of the car.

Completing the description of the valve unit 26 the casing 26' is provided with a duct 92, Figure 2, permanently interconnecting the control compartment 46 of the motor 45 with the aforementioned valve compartment 24. There is thus provided fluid transmitting means for at all times interconnecting the motor compartment 46, the valve compartment 24, and the control compartment 5 of the clutch operating motor 10. It follows therefore that the operation of the clutch control mechanism constituting my invention is controlled by controlling the gaseous pressure within the valve compartment 24.

There is thus provided a compact valve control unit 26 comprising a multi-sectional casing housing a three-way control valve and also housing means for operating said valve comprising a spring and pressure differential operated motor and an accelerator operated pin, said pin and the power element of the motor being connected with the movable part of said valve by means of a floating lever member.

Figure 4:
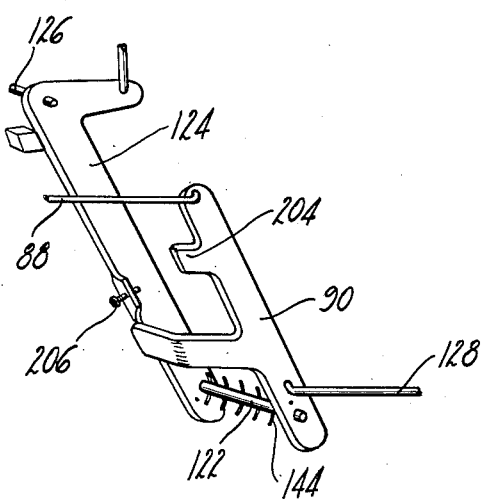
Figure 4 is a view disclosing the principal parts of the connection interconnecting the accelerator, the throttle and the control valve.

Describing now the force transmitting means interconnecting the accelerator 118 of the car with a throttle operating crank 120 and with the valve operating pin 41, said pin is connected to a rod 88 and this rod is pivotally connected with a lever member 90, Figure 4. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 2, to open the three-way valve, that is operate the same to effect a clutch disengaging operation of the motor 10. The spring 144 is preferably sleeved over the pin 122 and is connected at its ends to the levers 90 and 124. The operation of this part of the mechanism of my invention will be described hereinafter when the operation of the entire clutch control mechanism is described in detail.

Describing now the complete operation of the mechanism constituting my invention and incidentally completing the description of the parts not heretofore described; when the accelerator 118 is released to close the throttle and idle the internal combustion engine 114, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. In this operation of disengaging the clutch, the valve member 30 and the means for operating the same assume the relative positions disclosed in Figure 2, it being noted that the valve is lapped.

Describing this clutch disengaging operation of the valve 30, when the accelerator is released, the accelerator return spring 145 moves the end of the lever 36 to the position shown in Figure 2, a stop member 65 on the rod 41 serving to limit said movement. The valve operating motor 45 is at this time de-energized accordingly the springs 47 and 57 are expanded, that is, in their free length state. Now the parts of the mechanism are so constructed and arranged that the valve 30 is then in a position to interconnect the ports 53 and 53'. Accordingly, the above described clutch disengaging operation is effected, that is, the compartment 5 of the motor 10 is placed in air transmitting connection with the intake manifold to evacuate said motor, thereby energizing the same to disengage the clutch. In this operation air is withdrawn from the motor 10 and the valve operating compartment 46, into the intake manifold via the conduit 63, the valve compartment 55, the conduit 54, valve recess 51, ports 53, the compartment 24, the conduit 92 interconnecting the compartment 24 with the valve motor compartment 46, and the conduit 22 connecting the compartment 24 with the control chamber 5 of the clutch motor.

As air is withdrawn from the motor compartment 46, the piston 44 is moved to the left of Figure 2 to compress the high rate spring 57 and low rate spring 47; and the most important feature of my invention lies in the provision of the high rate spring 57, which acts as a yieldable stop in the mechanism for controlling the operation of the valve. The operation of the spring 57 may be varied by the setting of an adjusting screw 57' mounted in the end of the valve casing. Now the above described parts of the valve mechanism are so constructed and arranged and so operative that when the gaseous pressure within the chamber 46 reaches a certain factor, usually measured in inches of mercury of a manometer, the valve member 30 is positioned as disclosed in Figure 2, that is, its lapped position. In other words, the valve mechanism 26 is automatically operative, upon release of the accelerator, to effect a certain factor of evacuation of the motor 10. This degree of evacuation is preferably less than that effected in the conventional clutch operating vacuum motor of the day; and by so minimizing the clutch disengaging vacuum of the motor, the clutch engaging operation of said motor is expedited. Explaining the latter feature of my invention, if the motor 10 is subjected to a relatively low vacuum in effecting the disengagment of the clutch, it follows that the engagement of the clutch will be expedited, this by virtue of the relatively short time required to bring the gaseous pressure within the compartment 5 back to atmospheric pressure. In other words, by limiting the clutch disengaging vacuum of the motor 10 to a relatively low factor, there is provided means for effecting a relatively fast clutch engaging operation of said motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 2, to rotate the lever member 36 about its pivotal connection with the pin 43 as a fulcrum. The valve member 30 is thus moved to the left, Figure 2, the lever 36 operating as a lever of the second class to place the valve ports 53 in communication with a valve chamber 210 which chamber is at all times connected to the atmosphere via the interior of the valve member 30 and the valve compartment 48 which is at all times vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment 5 of the clutch operating motor 10 and the compartment 46 of the valve operating motor 45; and this flow of air results in a clutch engaging operation of the motor 10. Describing this operation the power element 7 of the motor 10 is moved to the right, Figure 1, by the clutch springs 17 and when said springs have expanded sufficiently to bring the clutch plates into light contact with each other, the movement of the power element is arrested.

Explaining this arresting operation the clutch spring 17, by its expansion, serves to maintain a relatively low gaseous pressure, that is vacuum, within the control chamber 5 of the motor 10. Now inasmuch as said control chamber is at all times connected to the valve chamber 24 and motor chamber 46 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the compressed springs 47 and 57 expand thereby lapping the three-way valve 28, 30, said position of the valve being disclosed in Figure 2. Describing this operation of the valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism of my invention are so constructed and arranged particularly the strength or load of the clutch springs, the area of the diaphragm 44 and the rate factor of the spring 47, that the valve is lapped to arrest the movement of the power element of the clutch motor when the clutch plates are in light contact with each other. It is to be particularly noted that when the valve 28, 30 is lapped to complete the above described first stage clutch engaging operation of the mechanism, that the high rate spring 57 is spent, that is exerts no load on the piston 44.

This operation of the motor 10 is usually described as the first stage operation thereof and it is to be noted that by varying the rate of the springs 47 and 57 that the termination of the first stage operation of the motor may be varied. In other words, by varying the rate of the springs 47 and 57 there is provided means for varying the degree of loading of the clutch plates or the degree of separation of said plates when the first stage of clutch engaging operation of the motor 10 is completed. It is to be noted the mechanism of my invention is preferably so constructed that this first stage of clutch engaging operation of said motor is completed shortly after or at substantially the same time as the opening of the throttle is initiated and as a result of a relatively small degree of depression of the accelerator. The first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby decreasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 fulcruming about its connection with the pin 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved into light engagement with each other and then pressed into a firmer contact, said latter operation being effected by a succession of steps if the driver chooses to depress the accelerator by a succession of steps; and he will probably do this if he desires to effect a slipping operation of the clutch. The latter operation, is, of course, necessary in effecting a very slow movement of the car such as when parking the same. The first stage operation of the mechanism, that is the operation to effect the relatively rapid movement of the clutch plates into light engagement with each other, will, by virtue of the relatively fast movement of the valve member 30 and its degree of movement during the initial increment of movement of the accelerator, be effected very quickly. The second stage clutch engaging operation of my clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed very shortly after or at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to steep up the vehicle with the transmission established in low gear; and when the desired vehicle speed is attained the driver will then release the accelerator preparatory to establishing the transmission in a higher gear ratio setting.

Figure 3:
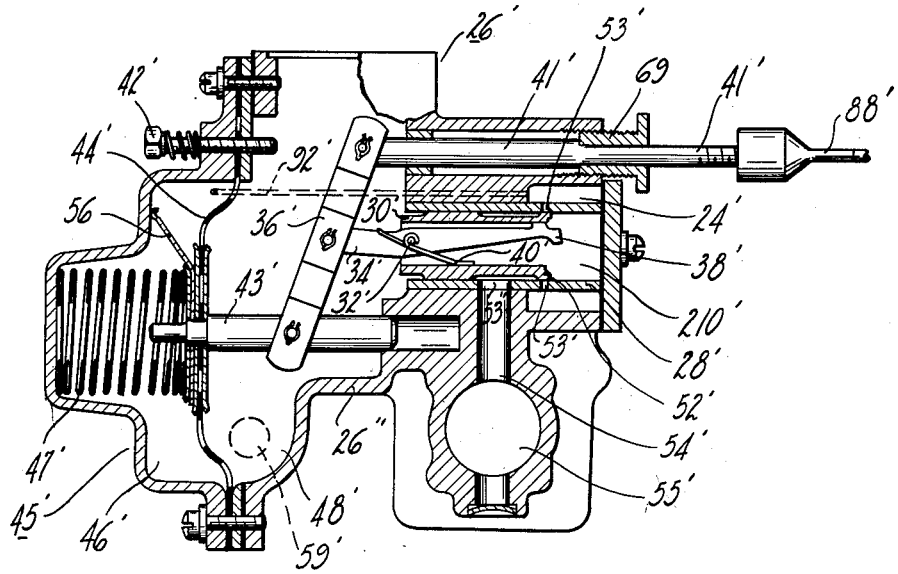
Figure 3 is a sectional view disclosing a modification of the mechanism of Figure 2.

There is disclosed in Figure 3 another embodiment of my invention, the parts disclosed in said figure duplicating like parts disclosed in Figure 2 being given the same reference numeral with the addition of a prime. The valve mechanism of Figure 3 differs from that disclosed in Figure 2 only in the adjustable means for determining the lapping operation of the valve to limit the degree of evacuation of the clutch motor. This adjustable means of Figure 3 lies in the provision of a stop 69 adjustably mounted in the valve casing and serving to determine the accelerator released position of the pin 41', and a three-prong leaf spring 56 interposed between one side of the piston 44' and the interior of the valve casing. As with the spring 57 of Figure 2, the leaf spring 56 functions as a yieldable stop cooperating with the remainder of the valve operating mechanism to effect a lapping of the valve when the gaseous pressure in the compartments 5 and 46' reaches a certain factor. With the mechanism of Figure 3, the accelerator released position of pin 41' is adjusted by the stop 69, there being no adjustment of the leaf spring 56; and with the mechanism of Figure 2, the adjusting operation is effected by the setting of the screw 57', there being no adjustment of the accelerator released position of the pin 41'. With the mechanism of both embodiments of my invention there is provided adjustable means for controlling the lapping operation of the valve, said operation determining the degree of evacuation of the motor 10 when the clutch is disengaged.

There is thus provided, by the friction clutch control mechanism of my invention, power means, including a pressure differential and spring operated motor controlled by a pressure balanced follow up valve for controlling the operation of the clutch, the time required to engage the clutch being reduced to a minimum.

It is thought that the invention and many of its attendant advantages will be understood from the foregoing description and though said invention has been illustrated in connection with but two modifications thereof it will be apparent that various changes may be made in the form, construction and arrangement of the parts without departing from the spirit and scope of the invention or sacrificing all of its material advantages, the form hereinbefore described being merely a preferred embodiment.

I claim:

1. Mechanism for operating the clutch of an engine driven vehicle comprising a fluid pressure motor, a follow-up valve including two relatively movable members, for controlling the operation of said motor, and means for operating said valve including means for determining the degree of movement of one of the valve members in one direction and cooperating with other parts of the mechanism to limit the energization of the motor in its operation of disengaging the clutch, said valve operating means including a floating lever operably connected to one of the parts of the valve, manually operated means connected to one end of the lever, a pressure differential and spring operated motor connected to the other end of the lever, and stop means, including a plurality of sequentially operable springs, positioned in contact with the power element of the latter motor, for determining a certain position of the lever to thereby effect the aforementioned controlled energization of the motor said stop means also serving to control the clutch engaging operation of the motor.

2. Mechanism for operating the clutch of an engine driven vehicle comprising a fluid pressure operated motor, a follow-up valve for controlling the operation of said motor, and means for controlling the operation of said valve to effect a limited energization of the motor in its operation of disengaging the clutch and to effect a step by step de-energization operation of the motor to effect a step by step clutch plate loading operation of the clutch, said valve operating means including a floating lever, a pressure differential operated motor including a power element operably connected to one end of said lever, and spring means, including a high rate spring and a low rate spring, acting sequentially upon said power element to control the operation of the latter motor the high rate spring serving to control both the clutch disengaging operation of the motor and the first stage of clutch engaging operation thereof.

3. In an automotive vehicle provided with an accelerator, an engine controlling throttle, and a friction clutch comprising a driving plate, a driven plate and yieldable means for forcing said plates into engagement with each other; power means for moving the driving plate out of engagement with the driven plate and for controlling the operation of the yieldable means to effect a stage engagement of the clutch, said power means including a fluid pressure motor, a two part follow-up valve for controlling the operation of said motor, and means for controlling the operation of said valve including a lever, force transmitting means, including a lost motion connection, interconnecting the accelerator, the throttle and one end of said lever, a pressure differential operated motor having its power element operably connected to the other end of said lever, spring means including a high rate spring and a low rate spring acting sequentially upon the power element of the latter motor and operable to control its operation; the parts of said mechanism being so constructed and arranged and so operative as to effect the first stage of clutch engaging operation of the driving clutch plate when the accelerator is depressed to take up the lost motion in its connection with the throttle the high rate spring operating, at this time, in effecting this first stage operation; to effect the second stage of the clutch engaging operation of said driving clutch plate as the accelerator is depressed to open the throttle, and to effect a limited energization of the clutch operating motor when the accelerator is released, the high rate spring controlling the valve to effect the latter operation.

4. In an automotive vehicle provided with a throttle, an accelerator and a friction clutch comprising a driving element, a driven element, and yieldable means biasing said driving element into engagement with the driven element; power means for separating the driving element from the driven element against the tension of said yieldable means, for controlling by a stage operation, the movement of said driving element into engagement with the driven element, and for synchronizing the opening of the throttle with the latter operation; said power means including a fluid pressure operated motor operably connected to the driving element, a follow-up valve for controlling the operation of said motor, means for controlling the operation of one of the parts of said valve including a floating lever; a fluid pressure operated motor having its power element connected to one end of the lever, force transmitting means interconnecting the other end of the lever with the accelerator, a high rate spring and a low rate spring, adapted to act sequentially upon one side of the power element of the latter motor the former spring cooperating with other parts of the mechanism to effect the first stage of clutch engaging operation of the mechanism, and force transmitting means interconnecting the throttle with the aforementioned force transmitting means.

RICHARD H. WHEELER.

REFERENCES CITED

The following references are of record in the file of this patent:

UNITED STATES PATENTS

| Number | Name | Date |
|---|---|---|
| 2,086,501 | Hill | July 6, 1937 |
| 2,152,088 | Price | Mar. 28, 1939 |
| 2,156,305 | Price | May 2, 1939 |
| 2,255,389 | Lange | Sept. 9, 1941 |
| 2,365,470 | Ingres | Dec. 19, 1944 |